United States Patent
Takeda et al.

(10) Patent No.: US 6,736,994 B2
(45) Date of Patent: May 18, 2004

(54) PHOSPHOR

(75) Inventors: Takashi Takeda, Tsukuba (JP); Susumu Miyazaki, Kitasoma-gun (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/058,128

(22) Filed: Jan. 29, 2002

(65) Prior Publication Data

US 2002/0158229 A1 Oct. 31, 2002

(30) Foreign Application Priority Data

Jan. 31, 2001 (JP) ........................ 2001-023244

(51) Int. Cl.$^7$ .................. H01J 11/02; C09K 11/77; C09K 11/63; C09K 11/54
(52) U.S. Cl. ............... 252/301.4 R; 313/582; 313/584; 313/643
(58) Field of Search .................. 252/301.4 R; 313/582, 313/584, 643

(56) References Cited

U.S. PATENT DOCUMENTS

| | | | | |
|---|---|---|---|---|
| 4,926,091 A | * | 5/1990 | Verlijsdonk et al. | ........ 313/486 |
| 4,946,621 A | * | 8/1990 | Fouassier et al. | ..... 252/301.4 R |
| 6,004,481 A | | 12/1999 | Rao | |

FOREIGN PATENT DOCUMENTS

| | | |
|---|---|---|
| DE | 198 27 252 A | 2/1999 |
| GB | 1 044 700 A | 10/1966 |
| WO | WO 99 50880 A | 10/1999 |

OTHER PUBLICATIONS

F.W. Tian et al., "Luminescence Properties of $Ce^{3+}$ and $Tb^{3+}$ in a New Family of Boron–Rich Alkaline Earth Rare Earth Borates", *Mat. Res. Bull.*, vol. 22, 1987, pp. 389–397.

F.W. Tian et al., "Luminescence of $Eu^{3+}$ and $Eu^{2+}$ in the New $BaLnB_9O_{16}$ Borates (Ln = Rare Earth)", *Mat. Res. Bull.*, vol. 22, 1987, pp. 899–909.

Z. Yang et al., "Photon cascade luminescence of $Gd^{3+}$ in $GdBaB_9O_{16}$", *Journal of Alloys and Compounds*, vol. 308, 2000, pp. 94–97.

Z. Yang et al., "Structural and luminescent properties of $LnBaB_9O_{16}:Eu^{3+}$", *Mat. Res. Bull.*, vol. 35, 2000, pp. 2173–2182.

W. Park et al., "Photoluminescence Properties of Red $BaGdB_9O_{16}:Eu$ Phosphor", *Extended Abstracts of The Sixth International Conference on the Science and Technology of Display Phosphors*, 2000, pp. 17–19.

* cited by examiner

*Primary Examiner*—C. Melissa Koslow
(74) *Attorney, Agent, or Firm*—Sughrue Mion, PLLC

(57) ABSTRACT

A phosphor having a high emission luminance and a vacuum ultra-violet radiation excited light emitting element in which the phosphor is used are provided. The phosphor may be made of Ba, Gd, Y, B, O, and an activator (one or more selected from the group consisting of Ce, and Tb). The phosphor may be expressed by a composition formula of $BaGd_{1-a-b}Y_aLn_bB_9O_{16}$ where Ln represents at least one selected from the group consisting of Ce, and Tb, and a and b satisfy $0.05 \leq a \leq 1$ and $0.003 \leq b \leq 0.5$, respectively. The foregoing phosphors are suitably used in a vacuum ultra-violet radiation excited light emitting element. The vacuum ultra-violet radiation excited light emitting element may comprise any one of the foregoing phosphors.

3 Claims, No Drawings

PHOSPHOR

FIELD OF THE INVENTION

The present invention relates to a phosphor suitably used in a vacuum ultra-violet radiation excited light emitting element such as a plasma display panel (hereinafter referred to as PDP) and a rare gas lamp, and to a vacuum ultra-violet radiation excited light emitting element in which the foregoing phosphor is used.

BACKGROUND OF THE INVENTION

A phosphor excited by vacuum ultra-violet radiation or the like to emit light has been proposed. For instance, $BaMgAl_{10}O_{17}$:Eu consisting of Ba, Mg, Al, O, and an activator (Eu) has been practically used as a blue phosphor for use in a vacuum ultra-violet radiation excited light emitting element, and $Zn_2SiO_4$:Mn consisting of Zn, Si, O, and an activator (Mn) has been practically used as a green phosphor. Examples of practically used red phosphors include (Y, Gd)$BO_3$:Eu consisting of Y, Gd, B, O, and an activator (Eu). However, to more suitably use the phosphors in PDPs, further improvement of the luminance of the phosphors is desired.

Recently, a red phosphor consisting of Ba, Gd, B, O and an activator (Eu), expressed as $BaGdB_9O_{16}$:Eu, was reported by Georgia Institute of Technology (Extended Abstracts of the Sixth International Conference on the Science and Technology of Display Phosphors, pp. 17–19) and has drawn attention.

SUMMARY OF THE INVENTION

An object of the present invention is to provide a phosphor having a high emission luminance and a vacuum ultra-violet radiation excited light emitting element in which the phosphor is used.

In such a situation, the inventors made earnest studies to solve the aforementioned problems, and consequently found that a phosphor having as a mother crystal a compound crystal consisting of Ba, Gd, Y, B, and O, and containing at least one or more substances selected from the group consisting of Ce, and Tb as an activator has a high emission luminance. Thus, the inventors have completed the present invention.

More specifically, the present invention provides a phosphor comprising of Ba, Gd, Y, B, O, and at least one selected from the group consisting of Ce, and Tb. The present invention also provides a phosphor suitable used in a vacuum ultra-violet radiation excited light emitting element, and a vacuum ultra-violet radiation excited light emitting element in which the above-mentioned phosphor is used.

DETAILED DESCRIPTION OF THE INVENTION

The following description will depict the present invention in detail.

The phosphor of the present invention is a phosphor comprising of Ba, Gd, Y, B, O, and at least one selected from the group consisting of Ce, and Tb, and at least one selected from the group consisting of Ce, and Tb is preferably used as an activator. Furthermore, the phosphor is preferably expressed by a composition formula of $BaGd_{1-a-b}Y_aLn_bB_9O_{16}$ (where Ln represents one or more selected from the group consisting of Ce, and Tb, and a and b satisfy $0.05 \leq a \leq 1$ and $0.003 \leq b \leq 0.5$, respectively). Since such a phosphor of the present invention has a high emission luminance particularly when being excited by vacuum ultra-violet rays, it is suitably used in a vacuum ultra-violet radiation excited light emitting element.

The phosphor of the present invention can be produced in the following manner.

Examples of materials to be used as a source of barium include: substances that are decomposed at a high temperature thereby becoming oxides, such as hydroxides, carbonates, nitrates, halides, oxalates, etc. with a high purity (not less than 99%); and oxides with a high purity (not less than 99.9%).

Examples of materials to be used as sources of gadolinium and yttrium include: substances that are decomposed at a high temperature thereby becoming oxides, such as hydroxides, carbonates, nitrates, halides, oxalates, etc. with a high purity (not less than 99%); and oxides with a high purity (not less than 99.9%).

As boron materials, boron oxide, boric acid, etc. with a high purity can be used.

Examples of material containing cerium, or terbium that can be used as an activator include: substances that are decomposed at a high temperature thereby becoming oxides, such as hydroxides, carbonates, nitrates, halides, oxalates, etc. with a high purity (not less than 99%); and oxides with a high purity (not less than 99.9%).

The method for manufacturing the phosphor of the present invention is not particularly limited, and the phosphor can be manufactured, for instance, by mixing and calcining the aforementioned materials. The phosphor expressed by the preferable composition formula of $BaGd_{1-a-b}Y_aLn_bB_9O_{16}$ (where Ln represents one or more selected from the group consisting of Ce, and Tb, and a and b satisfy $0.05 \leq a \leq 1$ and $0.003 \leq b \leq 0.5$, respectively) is produced by weighing and mixing the foregoing materials so that the foregoing composition is obtained and calcining the same. It should be noted, however, that normally the boron source is excessively mixed therein since a boron compound tends to decrease by evaporation during calcining. To mix the materials, a ball mill that is normally used industrially, a V-type mixer, an agitator, etc. can be used.

After mixing, the obtained mixture is calcined at a temperature in a range of approximately 900° C. to 1100° C. for approximately 1 to 100 hours, whereby a phosphor of the present invention can be obtained. In the case where substances that are decomposed at a high temperature thereby becoming oxides, such as hydroxides, carbonates, nitrates, halides, oxalates, etc. are used in materials, it is possible to pre-calcine the mixture at a temperature, for instance, in a range of approximately 600° C. to 800° C. before the main calcining.

An atmosphere for the calcining is not particularly limited. In the case where cerium or terbium is added as an activator, the mixture is preferably calcined in a reducing atmosphere such as nitrogen or argon containing about 0.1 to 10 vol % of hydrogen. The atmosphere for the pre-calcining may be an ambient atmosphere or a reducing atmosphere. To promote the calcining reaction, an appropriate amount of flux may be added.

Furthermore, the phosphor obtained by the foregoing method may be crushed by means of, for instance, a ball mill, a jet mill, etc. The phosphor also may be washed and classified. To improve the crystallinity of the obtained phosphor, it may be re-calcined.

The phosphor of the present invention thus obtained exhibits a high luminance when being excited by vacuum ultra-violet radiation, and therefore, it is suitably used in a vacuum ultra-violet radiation excited light emitting element such as a PDP or a rare gas lamp.

A PDP in which the phosphor of the present invention is used can be produced by a known method such as the method disclosed in JP 10(1998)-195428 A. Blue, green, and red phosphors for use in a vacuum ultra-violet radiation excited light emitting element are mixed in an organic solvent and a binder made of, for instance, a cellulose compound, or a polymer compound such as polyvinyl alcohol, so that a phosphor paste is prepared. The paste is applied, by a method such as screen printing, over an inner surface of a back substrate that is divided by separation walls in a strip form and is provided with address electrodes, as well as surfaces of the separation walls, and the applied paste is dried. Thus, the phosphor layers of the respective colors are formed. A surface glass substrate is laminated and bonded thereon, which is provided with transparent electrodes and bus electrodes that are directed in a direction orthogonal to the phosphor layers, as well as a dielectric layer and a protective layer on its inner surface. Then, the inside thereof is evacuated, while a rare gas such as Xe or Ne is introduced and sealed therein at low pressure, so as to form a discharge space. Thus, a PDP is produced. A vacuum ultra-violet radiation excited light emitting element such as a PDP or a rare gas lamp in which the phosphor of the present invention is used provides a high luminance.

The phosphor of the present invention can be excited by ultra-violet rays other than the vacuum ultra-violet rays, X-rays, electronic rays, etc., and can be used in an element that utilizes ultra-violet rays other than the vacuum ultra-violet rays, X-rays, and electronic rays as an exciting source.

EXAMPLES

The following description will depict the present invention in more detail, referring to examples. The present invention, however, is not limited by the examples.

Reference 1

Respective materials including 2.44 g of barium carbonate ($BaCO_3$), 2.07 g of gadolinium oxide ($Gd_2O_3$), 7.56 g of boric acid ($H_3BO_3$), and 0.16 g of europium oxide ($Eu_2O_3$) were mixed, and thereafter calcined in air at 1000° C. for 24 hours. Thus, a red phosphor expressed by a composition formula of $BaGd_{0.925}Eu_{0.075}B_9O_{16}$ was obtained. This phosphor was irradiated with vacuum ultra-violet rays by EXCIMER 146 nm LAMP (manufactured by Ushio Inc.) in a vacuum chamber with a vacuum of not more than 6.7 MPa ($5\times10^{-2}$ Torr). Consequently, the phosphor emitted red light.

Example

Respective materials including 2.56 g of barium carbonate ($BaCO_3$), 1.09 g of gadolinium oxide ($Gd_2O_3$), 0.68 g of yttrium oxide ($Y_2O_3$), 7.95 g of boric acid ($H_3BO_3$), and 0.18 g of terbium oxide ($Tb_4O_7$) were mixed, and thereafter calcined in a reducing atmosphere containing 2 percent by volume (vol %) of hydrogen and 98 vol % of nitrogen at 1000° C. for 24 hours. Thus, a green phosphor expressed by a composition formula of $BaGd_{0.4625}Y_{0.4625}Tb_{0.075}B_9O_{16}$ was obtained. This phosphor was irradiated with vacuum ultra-violet rays by EXCIMER 146 nm LAMP (H0012 Type manufactured by Ushio Inc.) in a vacuum chamber with a vacuum of not more than 6.7 MPa ($5\times10^{-2}$ Torr). Consequently, the phosphor emitted green strong light.

The phosphor of the present invention, which has a high emission luminance, can be particularly suitably used in a vacuum ultra-violet radiation excited light emitting element such as a PDP or a rare gas lamp, thereby implementing a vacuum ultra-violet radiation excited light emitting element having a high luminance. Thus, the phosphor of the present invention has a significant industrial advantage

What is claimed is:

1. A vacuum ultra-violet radiation excited light emitting element comprising a phosphor which comprises Ba, Gd, Y, B, O, and at least one selected from the group consisting of Ce, and Tb.

2. The vacuum ultra-violet radiation excited light emitting element comprising a phosphor according to claim 1, wherein the at least one selected from the group consisting of Ce, and Tb is used as an activator.

3. The vacuum ultra-violet radiation excited light emitting element comprising a phosphor according to claim 1, expressed by a composition formula of:

$$BaGd_{1-a-b}Y_aLn_bB_9O_{16}$$

where:

Ln represents at least one selected from the group consisting of Ce, and Tb; and a and b satisfy $0.05 \leq a \leq 1$ and $0.003 \leq b \leq 0.05$, respectively.

* * * * *

UNITED STATES PATENT AND TRADEMARK OFFICE
CERTIFICATE OF CORRECTION

PATENT NO. : 6,736,994 B2  
APPLICATION NO. : 10/058128  
DATED : May 18, 2004  
INVENTOR(S) : Takashi Takeda and Susumu Miyazaki It is certified that error appears in the above-identified patent and that said Letters Patent is hereby corrected as shown below:

In claim 3 at column 4, line 43 please change ".0003≦b≦0.05" to --0.003≦b≦0.5--.

Signed and Sealed this

Fifth Day of June, 2007

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,736,994 B2 | Page 1 of 1 |
| APPLICATION NO. | : 10/058128 | |
| DATED | : May 18, 2004 | |
| INVENTOR(S) | : Takashi Takeda and Susumu Miyazaki | |

It is certified that error appears in the above-identified patent and that said Letters Patent is hereby corrected as shown below:

In claim 3 at column 4, line 43 please change "$0.003 \leq b \leq 0.05$" to --$0.003 \leq b \leq 0.5$--.

This certificate supersedes Certificate of Correction issued June 5, 2007.

Signed and Sealed this

Seventeenth Day of July, 2007

JON W. DUDAS
*Director of the United States Patent and Trademark Office*